United States Patent
Chiang

(10) Patent No.: US 7,382,555 B2
(45) Date of Patent: Jun. 3, 2008

(54) OPTICAL MODULE

(75) Inventor: Tsung-Wei Chiang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/891,479

(22) Filed: Aug. 10, 2007

(65) Prior Publication Data
US 2007/0273988 A1 Nov. 29, 2007

Related U.S. Application Data

(63) Continuation of application No. 11/437,196, filed on May 18, 2006, now Pat. No. 7,304,811.

(30) Foreign Application Priority Data
Aug. 5, 2005 (CN) .................. 2005 1 0036407

(51) Int. Cl.
*G02B 9/04* (2006.01)
*G02B 5/04* (2006.01)

(52) U.S. Cl. ................................ 359/808; 359/811
(58) Field of Classification Search ........... 359/808, 359/811
See application file for complete search history.

(56) References Cited

U.S. PATENT DOCUMENTS 4,302,076 A * 11/1981 Hashimoto ............... 359/830
7,095,572 B2 * 8/2006 Lee et al. ................. 359/808
2006/0028573 A1 * 2/2006 Seo et al. ................ 348/340

* cited by examiner

Primary Examiner—Jordan M. Schwartz
Assistant Examiner—James C Jones
(74) Attorney, Agent, or Firm—Jeffrey T. Knapp

(57) ABSTRACT

An optical module (100) includes a lens barrel (10), a lens module (20), a filter (40) and a clip (50). The lens barrel defines a groove in an inner periphery thereof. The lens module is received in the lens barrel. The clip is received in the groove of the lens barrel, so as to fix the lens module in the lens barrel. The filter is received in the lens barrel, between the lens module and the clip.

10 Claims, 4 Drawing Sheets

OPTICAL MODULE

CROSS-REFERENCE TO RELATED APPLICATION

This application is a continuation application of U.S. Ser. No. 11/437,196, filed May 18, 2006, the contents of which are hereby incorporated by reference.

BACKGROUND OF THE INVENTION

1. Field of the Invention

The present invention generally relates to optical modules used in photography and imaging equipment and, more particularly, to an optical module for a digital camera.

2. Description of Related Art

Currently, digital camera modules are included as a feature in a wide variety of portable electronic devices and, of course, in stand-alone digital camera units. Most portable electronic devices are becoming progressively more miniaturized over time, and digital camera modules are correspondingly becoming smaller and smaller. Nevertheless, in spite of the small size of a contemporary digital camera module, consumers still demand excellent imaging.

Optical modules used for digital camera modules typically include a barrel, a lens module, a spacer, and a filter. The lens module and the spacer are received in the barrel. The filter is fixedly mounted in the barrel by using, for example, a glue/adhesive, thereby preventing the lens module and the filter from falling out of the barrel. When the glue/adhesive used to adhere the filter to the barrel is dilute, it can seep into the lens module via capillary action, thus impairing imaging quality of the optical module.

Therefore, a new optical module is desired in order to overcome the above-described shortcomings.

SUMMARY OF THE INVENTION

In one embodiment thereof, an optical module includes a lens barrel, a lens module, a filter and a clip. The lens barrel defines a groove in an inner periphery thereof. The lens module is received in the lens barrel. The clip is received in the groove of the lens barrel so as to fix the lens module in the lens barrel. The filter is received in the lens barrel and between the lens module and the clip.

Other novel features will become more apparent from the following detailed description when taken in conjunction with the accompanying drawings.

BRIEF DESCRIPTION OF THE DRAWINGS

Many aspects of the optical module can be better understood with reference to the following drawings. The components in the drawings are not necessarily drawn to scale, the emphasis instead being placed upon clearly illustrating the principles of the present optical module. Moreover, in the drawings, like reference numerals designate corresponding parts throughout the several views.

DETAILED DESCRIPTION OF THE INVENTION

Figure 1:
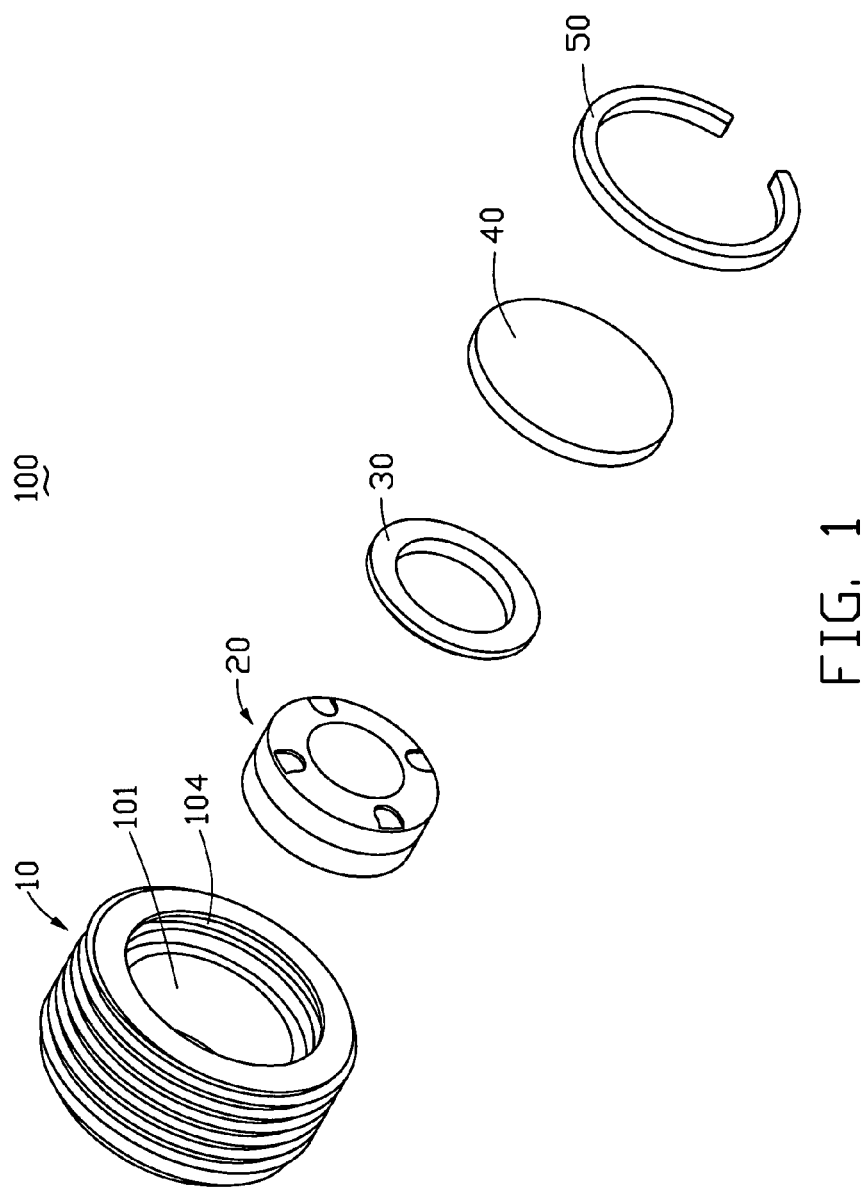
FIG. 1 is an exploded, isometric view of an optical module in accordance with a first embodiment.
Figure 2:
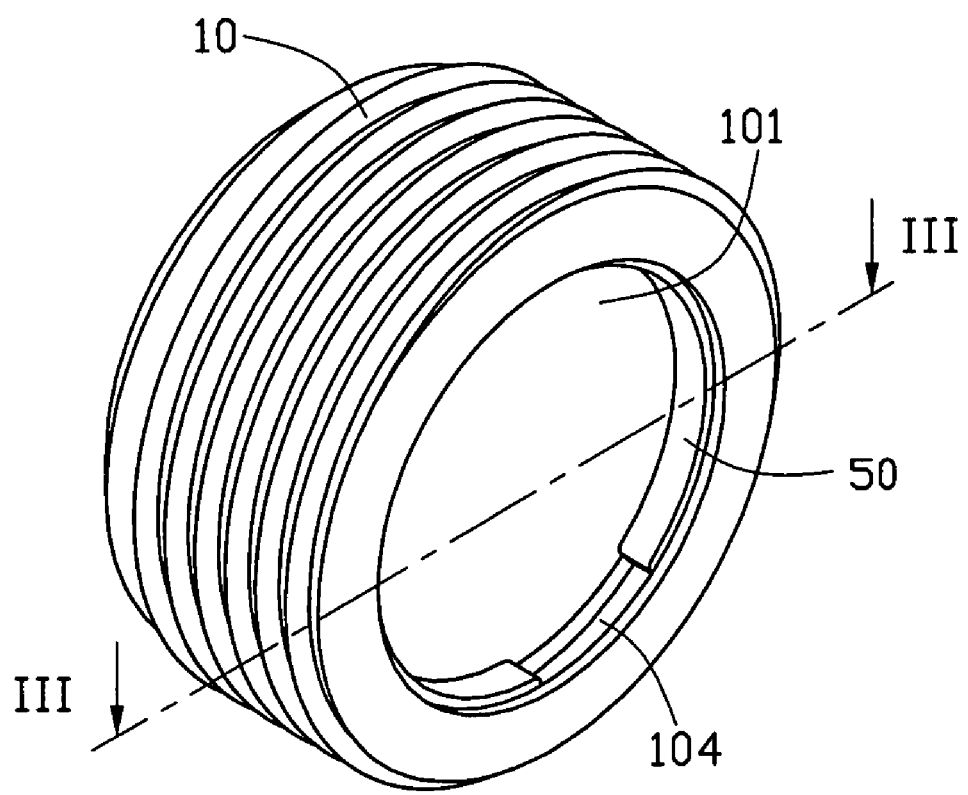
FIG. 2 is an enlarged, assembled, isometric view of the optical module shown in FIG. 1.

Referring to FIG. 1, an optical module 100 according to a first embodiment of the present invention includes a lens barrel 10, a lens module 20, a spacer 30, a filter 40, and a clip 50. Referring also to FIG. 2, the lens module 20, the spacer 30, the filter 40, and the clip 50 are engagingly received in the lens barrel 10 one on top of the other in that order.

Figure 3:
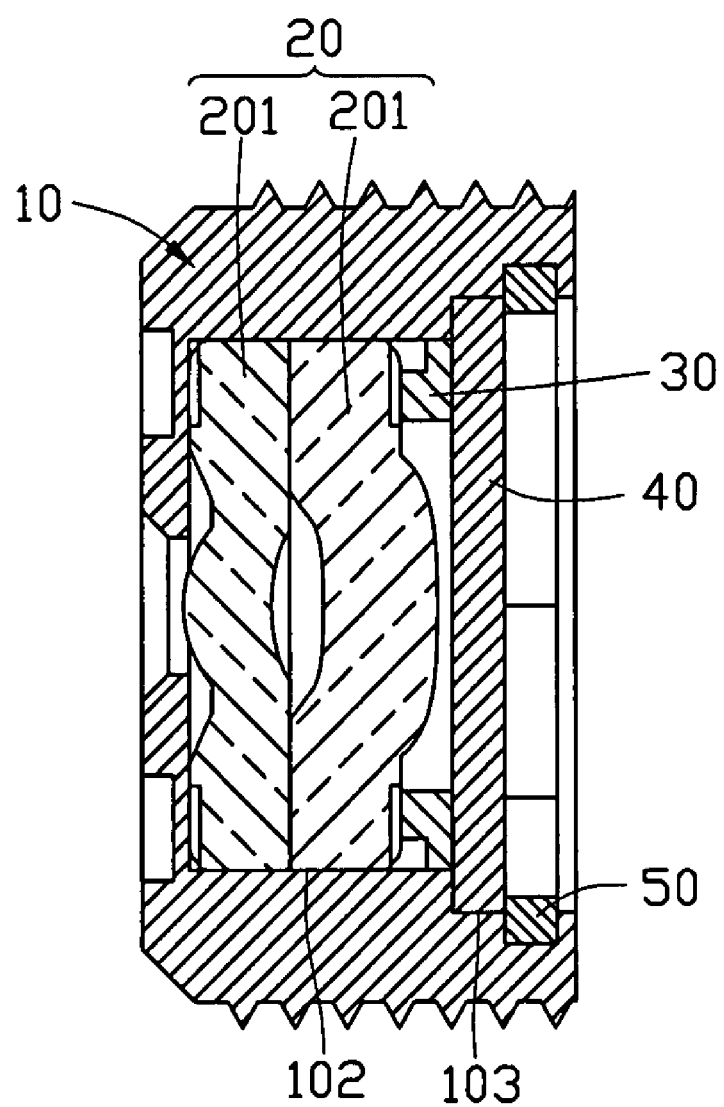
FIG. 3 is an enlarged, cross-sectional view taken along line III-III of FIG. 2.

Referring also to FIG. 3, the lens barrel 10 is substantially a hollow cylinder, having a partially-closed end and an open end on the opposite end to the partially-closed end. The lens barrel 10 includes a columned ladder-like cavity 101 therein. The cavity 101 has a small diameter cavity 102 adjacent to the partially-closed end, and a large diameter cavity 103 adjacent to the open end. The small diameter cavity 102 is configured for receiving the lens module 20 and the spacer 30. The large diameter cavity 103 is configured for receiving the filter 40. An annular groove 104 is defined in a surface of the large diameter cavity 103, and is configured for receiving the clip 50.

The lens module 20 includes at least one lens. In the illustrated embodiment, the lens module 20 includes two lenses 201. It is to be understood that lenses of any number and type could be used in the lens module 20.

The spacer 30 is substantially ring-shaped. The spacer 30 is engagingly received in the small diameter cavity 102 of the lens barrel 10. The spacer 30 is configured for adjusting a distance between the lens module 20 and other optical elements (for example, the filter 40) of the optical module 100.

The filter 40 is substantially disk-shaped. The filter 40 is engagingly received in the large diameter cavity 103 of the lens barrel 10. The filter 40 is used to selectively transmit light having certain properties, while blocking the remainder. The filter 40 can be selected, for example, from a group consisting of infrared-cut filters and low-pass filters.

The clip 50 is substantially a C-shaped ring, and made of elastic material. The clip 50 has an outer diameter slightly greater than a diameter of the groove 104 of the lens barrel 10, so that the clip 50 will be in a compressed state when the clip 50 is located in the groove 104 of the lens barrel 10, and will fix the lens module 20, the spacer 30, and the filter 40 in the lens barrel 10. In alternative embodiments, the clip 50 can be replaced by another fixation element, which can fix the lens module 20, the spacer 30, and the filter 40 in the lens barrel 10.

In assembly of the optical module 100, the lens module 20, the spacer 30, and the filter 40 are received in the cavity 101 of the lens barrel 10 in that order, and the lens module 20 is adjacent to the partially-closed end of the lens barrel 10. Then, the clip 50 aligns with the open end of the lens barrel 10, and an operator exerts a force on the clip 50, such that the clip 50 is deformed and located in the groove 104. At this time, the lens module 20, the spacer 30, the filter 40, and the clip 50 are all received in the cavity 101 of the lens barrel 10. The spacer 30 is located between the lens module 20 and the filter 40, with the spacer 30 abutting the lens module 20 and the filter 40. The filter 40 is located between the spacer 30 and the clip 50, with the filter 40 abutting the spacer 30 and the clip 50. The clip 50 is in a compressed state, thereby preventing the lens module 20, the spacer 30, and the filter 40 from falling out of the lens barrel 10, and fixing the lens module 20, the spacer 30, and the filter 40 in the lens barrel 10. The optical module 100 is thus completely assembled.

In the above-described assembly processes, the clip 50 can fix the lens module 20, the spacer 30, and the filter 40 in the lens barrel 10. Therefore, there is no need to use a glue/adhesive, so the lens module 20 will not be polluted by the glue/adhesive. Imaging quality of the optical module 100 can thus be improved.

Figure 4:
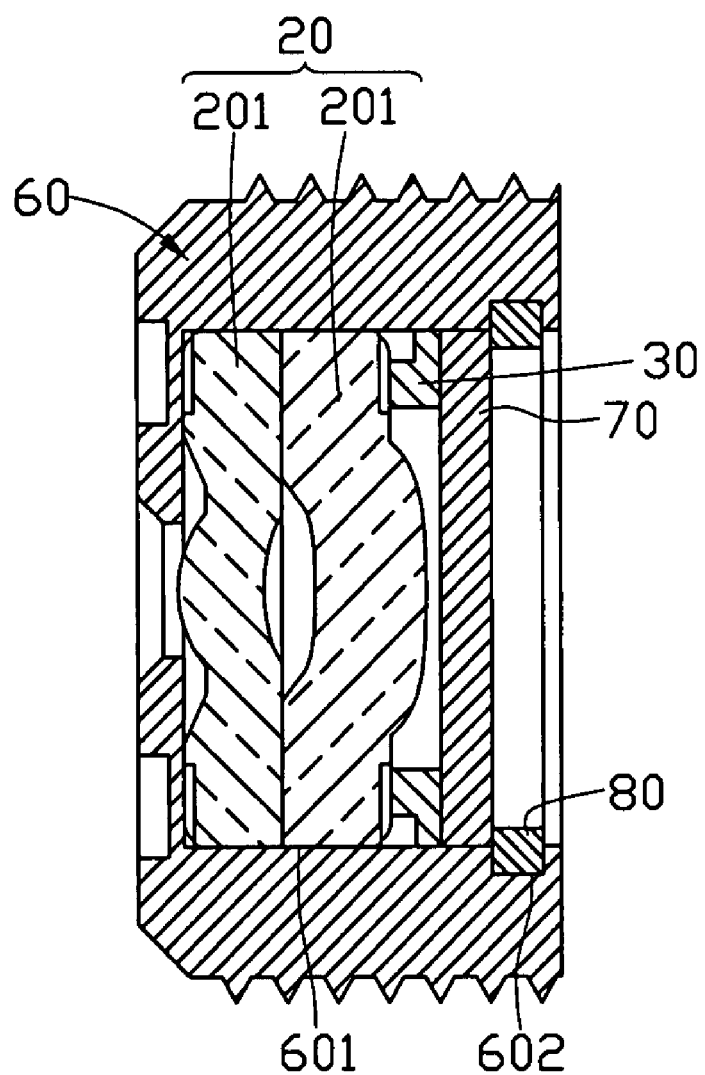
FIG. 4 is a schematic, cross-sectional view of an optical module in accordance with a second embodiment.

Referring to FIG. 4, an optical module 200 according to a second embodiment of the present invention is shown. Most of the structure of the optical module 200 of the second embodiment is similar to that of the optical module 100 of the first embodiment, except that a cavity 601 of a lens barrel 60 has a diameter cavity (not labeled). A groove 602 is defined in a surface of the cavity 601 adjacent to an open end of the lens barrel 60. A diameter of a clip 80 is slightly greater than a diameter of the groove 602. The clip 80 is in a compressed state when the clip 80 is located in the groove 602 of the lens barrel 60, thereby preventing a lens module 20, a spacer 30, and a filter 70 from falling out of the lens barrel 60, and fixing the lens module 20, the spacer 30, and the filter 70 in the lens barrel 60.

In the above-described embodiments, the lens barrels 10, 60, the cavities 101, 601, the spacer 30, the filters 40, 70 are all round-shaped. In alternative embodiments, the lens barrels 10, 60, the cavities 101, 601, the spacer 30, and/or the filters 40, 70 could be of another suitable shape, for example, arc-shaped.

In alternative embodiments, the spacer 30 could be omitted. Also, the filters 40, 70 could be omitted.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical module, comprising:
   a lens barrel being a hollow cylinder having a partially-closed end and an open end which is at an end of the lens barrel opposite to the partially-closed end, and defining a small diameter cavity adjacent to the partially-closed end, a large diameter cavity adjacent to the open end, and a groove in a surface of the large diameter cavity;
   a lens module received in the lens barrel;
   a clip received in the groove of lens barrel so as to fix the lens module in the lens barrel;
   a filter received in the lens barrel, the filter being located between the lens module and the clip; and
   a spacer engagingly received in the lens barrel and positioned between the lens module and the filter, the spacer being received in the small diameter cavity of the lens barrel, with the spacer abutting the lens module.

2. The optical module as claimed in claim 1, wherein the filter is received in the large diameter cavity of the lens barrel, with the filter abutting the spacer and the clip.

3. An optical module, comprising:
   a lens barrel defining, in order, a small diameter cavity, a large diameter cavity and a groove therein;
   a lens module received in the lens barrel;
   a spacer received in the small diameter cavity;
   a filter received in the large diameter cavity; and
   a clip received in the groove of lens barrel so as to fix the lens module, the spacer and the filter in the lens barrel.

4. The optical module as claimed in claim 3, wherein the lens barrel is a hollow cylinder having a partially-closed end and an open end, the open end being at the end of the lens barrel opposite to the partially-closed end.

5. The optical module as claimed in claim 4, wherein the small diameter cavity is defined adjacent to the partially-closed end, the a large diameter cavity is defined adjacent to the open end, and the groove is defined in a surface of the large diameter cavity.

6. The optical module as claimed in claim 3, wherein the spacer abuts the lens module.

7. The optical module as claimed in claim 3, wherein the filter abuts the spacer.

8. The optical module as claimed in claim 3, wherein the clip abuts the filter.

9. The optical module as claimed in claim 3, wherein the clip is a C-shaped ring and is comprised of an elastic material.

10. The optical module as claimed in claim 9, wherein an outer diameter of the clip is greater than a diameter of the groove of the lens barrel.

* * * * *